United States Patent
Gutshall

[11] 3,929,054
[45] Dec. 30, 1975

[54] FASTENING ELEMENT ADAPTED FOR TIGHTENING TO PREDETERMINED TORQUE

[75] Inventor: Charles E. Gutshall, Rockford, Ill.

[73] Assignee: Elco Industries, Inc., Rockford, Ill.

[22] Filed: Dec. 1, 1972

[21] Appl. No.: 311,367

[52] U.S. Cl. .................................................. 85/61
[51] Int. Cl.$^2$ ......................................... F16B 31/02
[58] Field of Search .............................. 85/61; 285/2

[56] References Cited
UNITED STATES PATENTS

| | | | |
|---|---|---|---|
| 1,473,910 | 11/1933 | Lambert | 285/2 |
| 1,530,679 | 3/1925 | Lambert | 285/2 |
| 3,191,486 | 6/1965 | Gibbens | 85/61 |
| 3,273,443 | 9/1966 | Rubin | 85/61 |

FOREIGN PATENTS OR APPLICATIONS

| | | | |
|---|---|---|---|
| 108,532 | 8/1917 | United Kingdom | 85/61 |
| 324,581 | 1/1930 | United Kingdom | 85/61 |

Primary Examiner—Edward C. Allen
Attorney, Agent, or Firm—Wolfe, Hubbard, Leydig, Voit & Osann, Ltd.

[57] ABSTRACT

A fastening element such as a screw adapted to be tightened in a workpiece by a tool to a predetermined torque includes a head comprising a base member integrally formed on the upper end of a threaded shank. A projection extending upwardly from the base telescopes through a central opening in a hexagonal plate shaped for engagement by the tool to tighten the screw in the workpiece and a boss on the upper end of the projection holds the plate on the base. In one embodiment, vertical splines on the projection mate with similar splines formed around the opening in the plate and the splines are of a predetermined strength correlated with the predetermined torque to keep the plate from turning relative to the base until the tightening torque applied by the tool exceeds the predetermined torque. This causes the splines to fracture so the plate slips around the projection to prevent the screw from being tightened excessively in the workpiece. In another embodiment, mating radial serrations formed in the lower surface of the plate and the upper surface of the base keep the plate from sliding loosely around the projection until the tightening torque exceeds the predetermined torque. Upon reaching the predetermined torque, the serrations slide over each other camming the plate upwardly and thereby bending the boss upwardly to free the plate to slip loosely around the projection and thereby prevent the screw from being tightened excessively in the workpiece.

13 Claims, 11 Drawing Figures

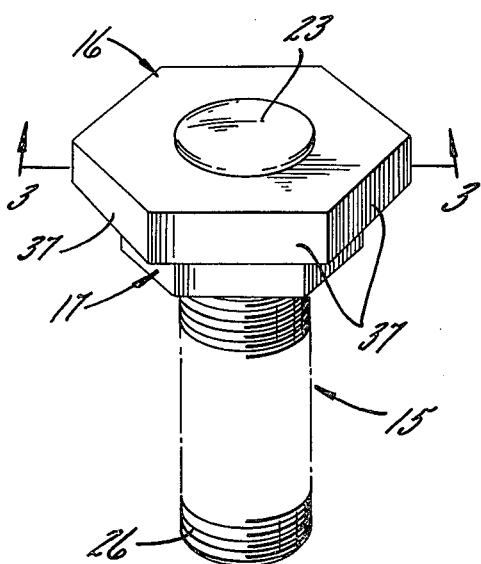
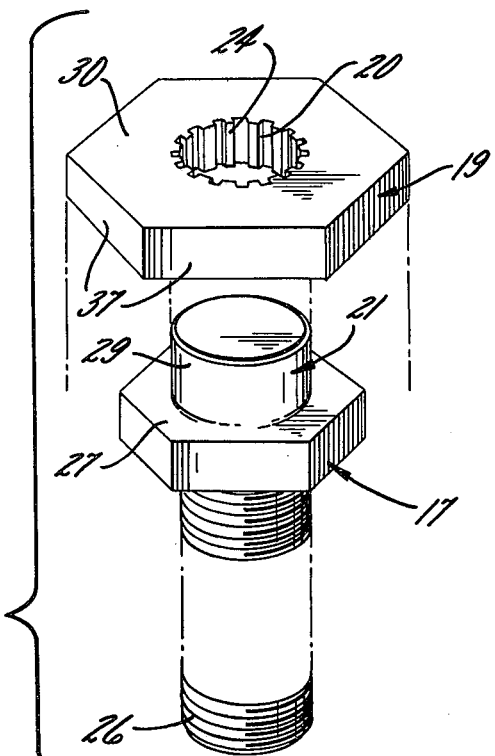
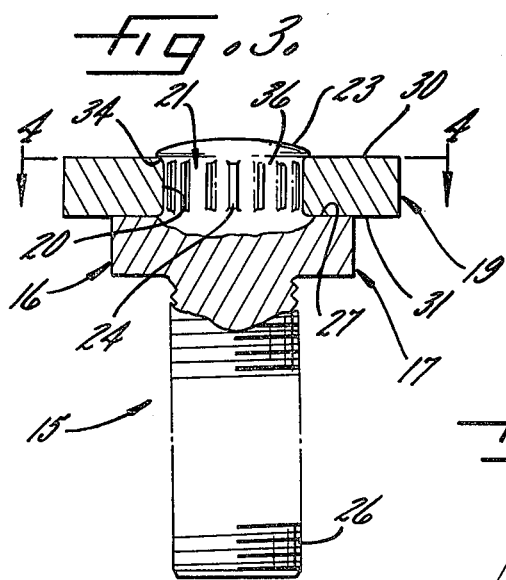
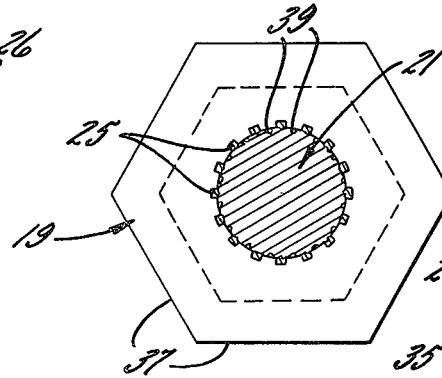
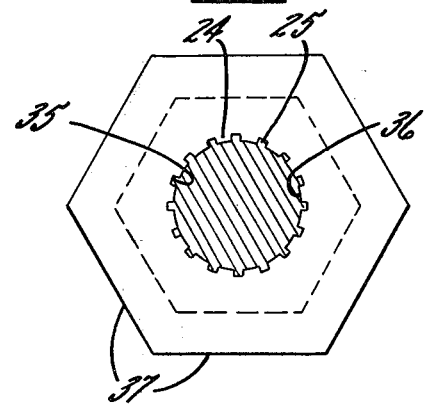
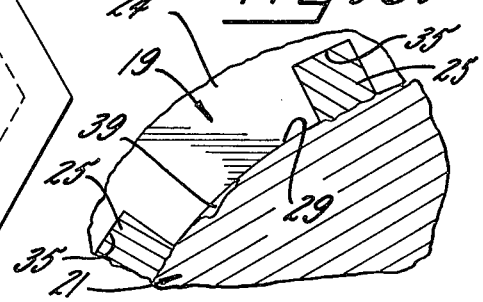

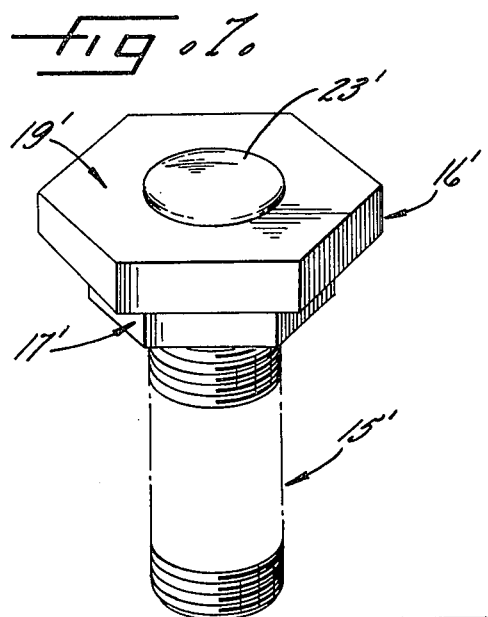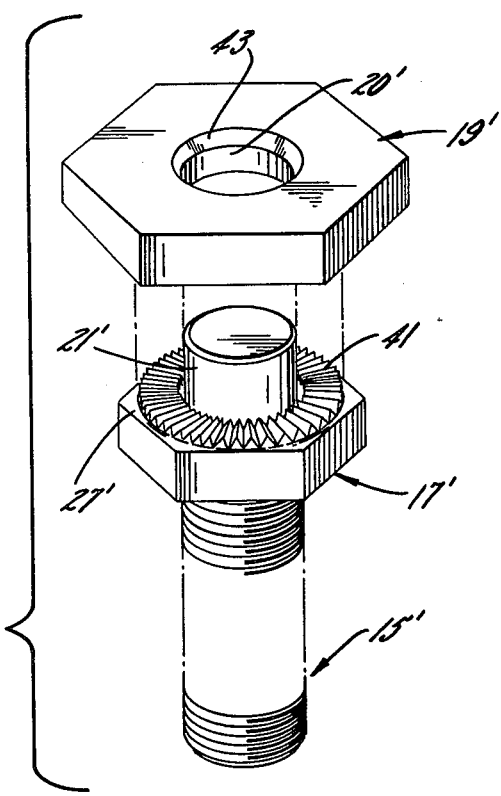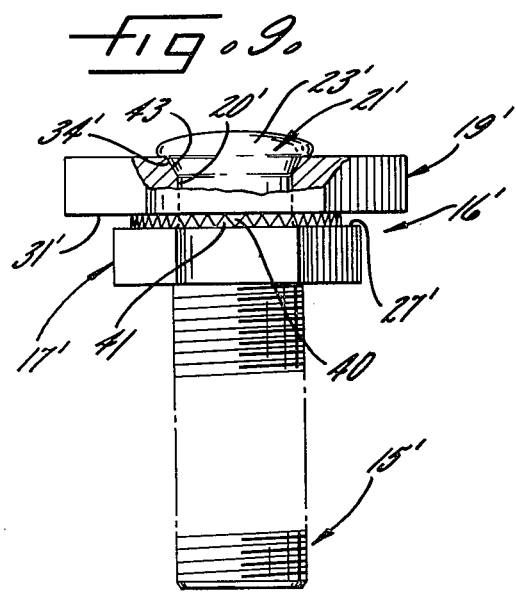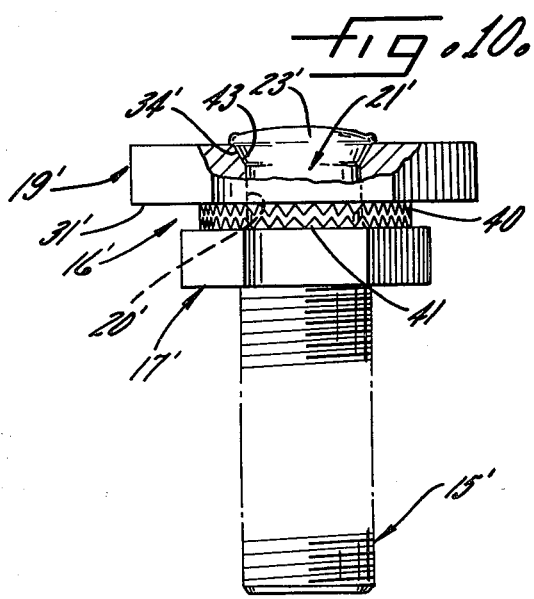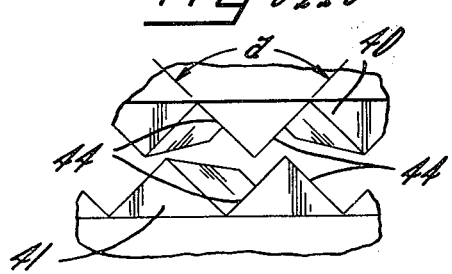

FASTENING ELEMENT ADAPTED FOR TIGHTENING TO PREDETERMINED TORQUE

BACKGROUND OF THE INVENTION

This invention relates generally to a fastening element and, more particularly, to a screw of the type which is adapted for tightening to a predetermined torque within a workpiece. Fastening elements of this general character are disclosed in U.S. Pat. No. 3,449,998 and 3,595,124.

SUMMARY OF THE INVENTION

The primary object of the present invention is to provide a new and improved fastening element of the above general character which is of simple construction and yet is easier to use in assembly line production. A more detailed object is to accomplish the foregoing by constructing the fastening element or screw with a novel head which is adapted to be engaged by a tool to tighten the screw in a workpiece to the desired predetermined torque without parts jamming in the tool or possibly being twisted off the head to fall from the tool and interfere with the assembly process.

A further object is to provide a screw which may be formed more accurately to be tightened to the predetermined torque and which may be formed to be tightened to a selected predetermined torque within a wider range than is possible with prior screws of the same general type.

Another object is to construct the head so that the screw may be tightened in the workpiece to the predetermined torque desired regardless of whether the screw is right-hand threaded or left-hand threaded.

The invention also resides in the novel construction of the head as comprising yieldable means including a boss holding the members comprising the head together in an assembled relationship and interfitting parts which are formed on the members and adapted to hold the members against turning relative to each other until the tightening torque applied to the head by the tool exceeds the predetermined torque, the boss still continuing to hold the parts on the head even after the screw is tightened into the workpiece.

These and other objects and advantages of the present invention will become more apparent from the following detailed description when taken in conjunction with the accompanying drawings.

BRIEF DESCRIPTION OF THE DRAWINGS

FIG. 1 is a perspective view of a screw embodying the novel features of the present invention.

FIG. 2 is an exploded perspective view of parts of the screw shown in FIG. 1.

FIG. 3 is an elevational view with parts broken away and shown in cross section.

FIG. 4 is an enlarged cross-sectional view taken substantially along line 4—4 of FIG. 3.

FIG. 5 is a view similar to FIG. 4 but showing parts of the screw in moved positions.

FIG. 6 is an enlarged fragmentary view similar to FIG. 5.

FIG. 7 is a perspective view of an alternate form of the present invention.

FIG. 8 is an exploded perspective view of parts of the screw shown in FIG. 7.

FIG. 9 is an elevational view of the screw shown in FIG. 7 with parts broken away and shown in cross section.

FIG. 10 is an enlarged fragmentary view similar to FIG. 9 but showing parts of the screw in moved positions.

FIG. 11 is an enlarged fragmentary view similar to FIG. 10.

DETAILED DESCRIPTION OF THE PREFERRED EMBODIMENTS

As shown in the drawings for illustration, the present invention is embodied in a fastening element 15 particularly adapted to be tightened to a predetermined torque on another member such as a workpiece (not shown). While the fastening element may take various other forms such as a bolt and nut arrangement, herein, the fastening element is a screw particularly adapted for use in assembly line production such as in the automotive industry. As in the fastening elements disclosed in the above-mentioned patents, the screw is tightened by a tool to the predetermined torque and, when the tightening torque applied by the tool exceeds the predetermined torque, portions of the head 16 of the screw engaged by the tool give way causing the tool to slip to prevent the screw from being tightened excessively in the workpiece.

In accordance with the primary aspect of the present invention, the fastening element 15 uniquely is adapted to be tightened to the predetermined torque on another member such as the workpiece without parts of the fastening element being twisted off by the tightening tool. For this purpose, portions of the element include a base member 17 and a plate member 19 having a central opening 20 which is telescoped over a projecting member 21 extending upwardly from the base member. Yieldable means on the members coact to hold the plate member downwardly against the base member and to keep the plate member from being turned relative to the base member by the tool until the tightening torque applied to the plate member exceeds the predetermined torque. Herein, the yieldable means includes a boss 23 formed on the upper end of the projecting member to hold the plate downwardly against the base member and parts 24 on the plate member interfit with corresponding parts 25 on one of the other members to help hold the plate member against being turned relative to the base member by the tool. Once the tightening torque applied to the plate member exceeds the predetermined torque, the means yields to permit the plate member to slip freely around the projecting member to keep the fastening element from being excessively tightened in the workpiece. Advantageously, with this arrangement, individual portions of the fastening element are kept from being twisted off by the tool to jam in the tool or to possibly fall from the tool and interfere with the assembly process.

In the exemplary embodiment of the invention illustrated in FIGS. 1 through 6, the fastening element or screw 15 includes a threaded shank 26 adapted to mate with a threaded opening (not shown) in the workpiece. On the upper end of the shank is the head 16 including the base member 17 which is integrally formed with the upper end of the shank and the projecting member 21. The latter extends upwardly from the center portion of the upper surface 27 of the base (see FIG. 2) and is generally cylindrical in shape having a vertical side wall 29. The plate 19 is telescoped over the projection so the upper end of the projection extends upwardly through the opening 20 in the center of the plate and beyond the upper surface 30 of the plate (see FIG. 3). More particularly, the lower surface 31 of the plate rests against the upper surface of the base 17 and, preferably, the plate is hexagonal in shape for engagement by conventional tools for tightening the screw in the workpiece. The base also is hexagonal in shape but is smaller in size than the plate so that, when the screw is tightened in the workpiece, the lower surface 31 of the plate is spaced upwardly of the surface of the workpiece a predetermined distance depending upon the thickness of the base. This arrangement, allows the tool to engage with the plate for tightening the screw in the workpiece without the tool also engaging with the base and, in addition, a second smaller tool may be inserted beneath the plate so the screw can be loosened from the workpiece should such be desired after the screw is tightened in the workpiece.

To enable the screw 15 to be tightened in the workpiece without exceeding the predetermined torque of the screw, the yieldable means holds the plate 19 on the base 17 and keeps the plate from turning relative to the base until the tightening torque applied to the plate by the tool exceeds the predetermined torque. In the instant embodiment, the yieldable means includes the boss 23 and the parts 24 and 25 on the plate and the projection are formed as interfitting splines adapted to keep the plate from being turned relative to the base until the tightening torque exceeds the predetermined torque. Herein, the boss is formed around the upper end of the projection by staking the plate on the projection so the underside 34 on the boss engages the upper surface 30 of the plate around the opening 20 to hold the plate downwardly on the base. The splines 24 and 25 on the plate and the projection respectively are of a predetermined strength correlated with the predetermined torque of the screw, the splines in the plate being formed around the edge of the opening prior to staking the plate on the projection. More particularly, each of the splines extends vertically within the surface defining the opening and is generally rectangular in cross-section (see FIG. 4). Similarly, the splines 25 on the projection also are generally rectangular in shape being formed as an incident to staking the plate on the projection and extending vertically in the side wall 29 of the projection. Because the diameter of the projection is slightly larger than the diameter of the opening in the plate, staking the plate on the projection causes material from the projection to flow into the grooves 35 between the splines on the plate thereby forming the splines on the projection and, at the same time, the grooves 36 in the projection are formed by the splines in the plate.

Advantageously, the predetermined strength of each of the splines 24 and 25 is controlled in relation to the size of the splines as well as the thickness of the plate 19. Accordingly, the predetermined torque to which the screw 15 may be tightened can be controlled accurately by selection of a desired number and size of the splines and a particular thickness for the plate. For instance, a greater predetermined strength in each of the splines, and hence a greater predetermined torque, may be obtained by increasing the width and depth of the splines and an increased predetermined torque may be obtained by increasing the number of splines. Additionally, the use of a thicker plate will produce a screw with a predetermined torque greater than a similar screw having the same number of splines which are of equal width and depth but of less height. Thus, by choosing selectively between various combinations of sizes and numbers of splines, the screw may be made accurately to the selected predetermined torque within a wide range of values.

When tightening the screws 25 in the workpiece with the tool, the latter fits around the sides 37 of the plate 19 so that the tightening torque applied to the plate is transferred through the interfitting splines 24 and 25 to thread the screw in the workpiece. As long as the tightening torque applied to the plate is less than the combined predetermined strengths of the splines, the screw will continue to thread into the workpiece, but when the tightening torque exceeds the predetermined strength of the interfitting splines 25, the latter give way and fracture at 39 along the side wall 29 to remain in the grooves 35 of the plate (see FIGS. 5 and 6) thereby permitting the plate to slip loosely around the projection 21 to prevent excessive tightening of the screw in the workpiece. Advantageously, this slippage of the tool around the screw readily indicates that the screw is tightened properly within the workpiece so that the tool can be pulled away from the workpiece to prepare for the tightening of another screw. Moreover, by virtue of the overlapping between the boss 23 and the upper surface 30 of the plate, the latter is held on the screw as the tool is pulled away so the plate is kept from being twisted off the screw possibly to jam in the tool or to fall from the tool and interfere with the assembly process, the boss also serving to captivate the fractured splines within the grooves 35.

In an alternative form of the invention as shown in FIGS. 7 through 11, parts corresponding to those described above are indicated by primed numerals. In this embodiment, the yieldable means in the head 16' of the screw 15' includes a boss 23' of predetermined strength correlated with said predetermined torque and coacting with mating radial serrations 40 and 41 on the plate 19' and the base 17' respectively to keep the plate from being turned loosely relative to the base prior to tightening the screw to the predetermined torque. As the lightening torque applied to the screw exceeds the predetermined torque, the serrations slide over each other camming the plate upwardly against the boss so the latter yields and is bent upwardly (see FIG. 10) a predetermined distance equal to the height of the serrations 40 to permit the plate to slip loosely around the projection 21' so the screw is kept from being tightened excessively in the workpiece.

Herein, the plate 19' is staked to the projection 21' in generally the same manner as is done in the first embodiment, but preferably a beveled surface 43 in the plate surrounds the opening 20' through which the projections extends. When staked on the plate, the under surface 34' of the boss mates with the beveled surface (see FIG. 9) and thus tapers downwardly toward the side wall 29' from the top of the projection so the boss is cammed upwardly by the plate (see FIG. 10) as opposed to being fractured. Advantageously, even after being moved upwardly by the plate, the diameter of the boss remains greater than the diameter of the opening 20' so the boss continues to hold the plate on the projection.

To move the plate 19' upwardly on the projection 21', the serrations 40 and 41 are formed in the lower surface 31' of the plate and the upper surface 27' of the base, each serration extending radially from adjacent the center portion of its associated surface and including two opposing sides 44 (see FIG. 11). The latter are each slanted relative to vertical at the same angle represented by one-half the included angle a, herein about ninety degrees, between the two sides and converge upon each other at a position spaced from their associated surface. By virtue of this arrangement, the plate cams upwardly against the boss 23' to move the latter the predetermined distance when tightened by the tool regardless of the direction which the screw is to be threaded into the workpiece, thus the same head 16' may be formed on both right-hand threaded and left-hand threaded screws.

I claim as my invention:

1. A fastening element adapted to be threaded into a workpiece to a predetermined torque by a tool, said element including an elongated threaded shank, and a head on one end of the shank comprising a base member integrally formed with the upper end of said shank, a projecting member extending upwardly from said base member, a plate member with a central opening telescoped on said projecting member and being shaped for engagement by said tool to tighten the screw in the workpiece, and permanently yieldable means adapted to hold said plate against turning relative to said projecting member until the tightening torque applied to said plate exceeds said predetermined torque and said means thereafter being permanently deformed so said plate member may slip freely around said projecting member, said means including a boss formed on the upper end of said projecting member and being spaced from said base member a distance substantially equal to the thickness of said plate, said boss engaging said plate member and holding the latter on said projecting member and against said base member, said means further including a first series of parts integrally formed of the material of said plate member, a second series of parts integrally formed of the material of another of said members, said first and second series of parts being oriented on their respective members to allow said plate member to be telescoped onto said projecting member with said parts in said first and second series interfitting with each other to hold said plate against turning relative to said projecting member until the tightening torque applied to said plate by the tool exceeds said predetermined torque, at least one of said boss and said interfitting parts being permanently deformed when said tightening torque exceeds said predetermined torque.

2. A fastening element as defined by claim 1 wherein said plate member is generally polygonal in shape, said projecting member having a vertical side wall, said interfitting parts including interfitting splines formed in said side wall and in said plate member adjacent said opening, said splines being of a predetermined strength correlated with said predetermined torque to yield as the tightening torque exceeds said predetermined torque.

3. A fastening element as defined by claim 2 wherein said base member is of a predetermined shape similar to and smaller than the shape of said plate to enable a second tool to fit beneath said plate and around said base to loosen and retighten the screw in the workpiece.

4. A fastening element as defined by claim 3 wherein said projecting member is generally cylindrical in shape and said plate member is generally hexagonal in shape, said boss being formed by staking said plate member on said projecting member.

5. A fastening element as defined by claim 4 wherein the cross-sectional shape of each of said splines is generally rectangular.

6. A fastening element as defined in claim 1 wherein said plate member is generally polygonal in shape and includes a lower surface, said base member having an upper surface and being integrally formed with said shank, said interfitting parts including mating radial serrations formed in the lower surface of said plate member and in the upper surface of said base, said boss normally holding said plate member downwardly against said base member to hold said serrations to interfit with each other, said boss being of a predetermined strength correlated with said predetermined torque to be bent upwardly by said plate as the latter is cammed upwardly against said boss as the serrations slide across each other when the tightening torque exceeds said predetermined torque.

7. A fastening element as defined by claim 6 wherein said plate members includes an upper surface and a downwardly and inwardly formed beveled surface on the upper surface of said plate around the edge of said opening, said boss having an under surface tapering downwardly toward said projection from the top of said boss, said beveled surface camming against said tapered under surface to move said boss upwardly on said projection as said tightening torque exceeds said predetermined torque.

8. A fastening element as defined by claim 7 wherein each of said serrations includes two generally radial sides of generally equal size and shape, each of said sides being slanted relative to vertical at the same angle to converge toward each other upon progressing vertically from the surface within which the serration is formed so that said plate member is cammed upwardly by the relative sliding between the sides of the serrations in said plate member and the sides of the serrations in the base member regardless of the direction which the screw is threaded into the workpiece.

9. A fastening element as defined by claim 8 wherein the two sides of each of said serrations converge upon each other at an included angle approximately ninety degrees.

10. A fastening element as defined by claim 9 wherein said base member is of a predetermined shape similar to and smaller than the shape of said plate to enable a second tool to fit beneath said plate and around said base to loosen and retighten the screw in the workpiece.

11. A fastening element as defined by claim 10 wherein said projecting member is generally cylindrical in shape and said plate member is generally hexagonal in shape, said boss being formed by staking said plate member on said projecting member.

12. A fastening element adapted to be threaded into a workpiece to a predetermined torque by a tool, said element including an elongated threaded shank, and a head on one end of said shank comprising a base integrally formed with the upper end of said shank, an integral projection with a side wall extending upwardly from said base, a polygonal plate with a central opening telescoped over said projection, a boss on the upper end of said projection holding said plate against said base, vertical splines formed in said side wall and in said plate adjacent said opening, said splines interfitting with each other and being of a predetermined strength correlated with said predetermined torque to fracture as the tightening torque applied to said plate by said tool exceeds said predetermined torque thereby causing said plate to slip loosely around said projection.

13. A fastening element adapted to be threaded into a workpiece to a predetermined torque by a tool, said element including an elongated threaded shank, and a head on the end of said shank comprising a base having an upper surface and being integrally formed with the upper end of said shank, an integral projection extending upwardly from said base, a polygonal plate having a lower surface and a central opening telescoped over said projection, mating radial serrations formed in the lower surface of said plate and in the upper surface of said base, a boss formed on the upper end of said projection, engaging the plate and normally holding the latter downwardly against said base with said serrations interfitting with each other, said boss further being of a predetermined strength correlated with said predetermined torque and swaged upwardly by said plate and permanently deformed thereby as said plate is cammed upwardly against the boss as the serrations slide across each other when the tightening torque applied to said plate by said tool exceeds said predetermined torque.

* * * * *